United States Patent [19]

Borgersen et al.

[11] 4,397,198

[45] Aug. 9, 1983

[54] MARINE TRANSMISSION ASSEMBLY SYSTEM

[75] Inventors: Kjell-Idar Borgersen, Hjalteby; Lennart H. Brandt, Fjaras, both of Sweden

[73] Assignee: AB Volvo Penta, Goteborg, Sweden

[21] Appl. No.: 151,626

[22] Filed: May 20, 1980

[30] Foreign Application Priority Data

May 23, 1979 [SE] Sweden ................................ 7904535

[51] Int. Cl.³ .......................... F16H 3/08; F16H 57/02

[52] U.S. Cl. ......................................... 74/378; 440/75; 74/606 R; 74/355

[58] Field of Search ................. 74/355, 376, 378, 379, 74/416, 423, 606 A, 606 R; 440/75

[56] References Cited

U.S. PATENT DOCUMENTS

| | | | |
|---|---|---|---|
| 2,164,487 | 7/1939 | Beckjord | 74/355 |
| 2,718,792 | 9/1955 | Kiekhaefer | 440/75 |
| 2,821,864 | 2/1958 | Baker | 74/378 |
| 2,928,513 | 3/1960 | Rhodes et al. | 74/378 |
| 3,212,349 | 11/1965 | Bergstedt | 74/378 |
| 3,269,497 | 8/1966 | Bergstedt | 74/378 |
| 3,447,504 | 6/1969 | Shimanckas | 440/75 |
| 3,505,894 | 4/1970 | Halibrand | 74/379 |

FOREIGN PATENT DOCUMENTS

| | | | |
|---|---|---|---|
| 925648 | 3/1947 | France | 74/378 |
| 890326 | 2/1962 | United Kingdom | 74/378 |

*Primary Examiner*—Kenneth Dorner
*Assistant Examiner*—Lawrence J. Gotts
*Attorney, Agent, or Firm*—Arthur G. Yeager

[57] ABSTRACT

A reversing double cone clutch drive assembly for a boat comprising a horizontal input shaft, a vertical intermediate output shaft, a first housing provided with an opening in a side wall opposite to the input shaft and an opening in a bottom wall through which the lower end of said intermediate output shaft is exposed, and selectable gear transmission subassemblies attachable to such clutch drive assembly, each subassembly including a second housing with a generally horizontal wall for engaging such bottom wall, said second housing carrying a bearing which mounts an output shaft driven through gear means by said intermediate output shaft said housings being filled interiorly with lubricating oil, in heat exchange relationship with cooling water exterior of said housing.

20 Claims, 9 Drawing Figures

28
34
29
18
16
27
26
35
30
2
14
22
5
36
9
8
7
3
31
32
33
19
11
4
12
10
6
15
24
17
47
42
13
20
1
21
25
23

46
58
57
61
50
59
60
51
62
53
65
45
55
56
64
54
48
49
13
47
42
41
52
43
20
44
61
25
63
23
40
38
22
37

28
27
35
2
30
57
66
3
62
53
22
63
37
39
38

1
67
69
21
86
87
84
76
22
78
25
20
85
80
79
72
70
75
62'
71
83
82
81
73
77
61'
51'
50'
74
65'
44'
49'
61'
88
89
53'
57'
63'

1
76'
22
79'
91
80'
92
93
57''
62''
50'' 61''
51''
65''
90
44''
49''
49''
61''
88'
89'
94
53''
63''

1
3
68
66
67
57"
62"
53"
90
88'
89'
63"

1
66
95

1
21
13
103
97
101
99
100
102
95
96
98

MARINE TRANSMISSION ASSEMBLY SYSTEM

THE INVENTION

This invention relates to drive arrangements for boats, and, particularly, to reversing clutch gear transmission assemblies for disposition in the drive train between an engine and the propeller shaft.

OBJECTS OF THE INVENTION

An object of the invention is to provide improved reversing clutch gear transmission assemblies. A specific object of the invention is to reduce the cost of such assemblies, particularly by providing a universally adaptable reversing cone clutch subassembly and a plurality of gear transmission subassemblies interchangeably and selectably attachable to such clutch subassembly. It is a further specific object to provide interchangeable cooling jacket elements, gears and other parts useable in one and another gear transmission subassembly.

PRIOR ART

A double cone reversing clutch mechanism particularly adapted for use in the present invention may be of the type shown, described and claimed in U.S. Pat. No. 3,212,349 or No. 3,269,497 to Bergstedt, and as used in "Aquamatic" inboard—outboard drive units manufactured and sold by A. B. Volvo Penta since that time and to the present, and further as manufactured and sold since 1976 by said A. B. Volvo-Penta incorporated in model MS3 reverse gear assemblies.

Thus, while it has been known to provide such reversing clutches in gear transmission assemblies, the present invention contemplates a reversing clutch subassembly which, without change, is adapted to be incorporated in a straight reducing gearbox, in a downstep reducing gear transmission, in a V-drive transmission, or in transmission for use with a fixed vertical drive leg to extend through a boat bottom, such as in drives typically intended for sailboats.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Figure 1:
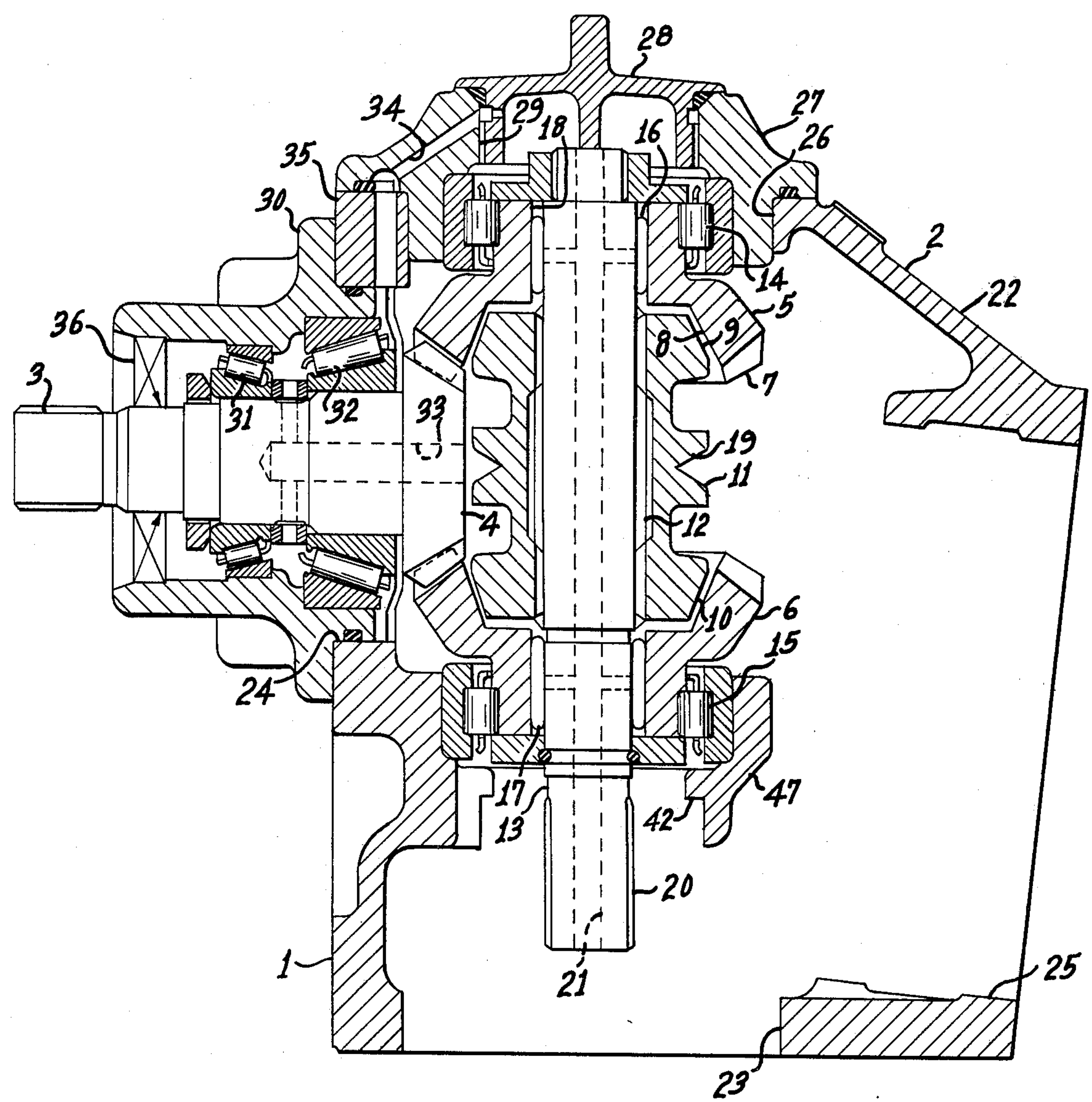
FIG. 1 is a cross sectional view in elevation of the reversing clutch drive assembly.

Referring to FIG. 1 of the drawings, reversing clutch subassembly 1 comprises a housing 2, a horizontal input shaft 3 carrying a conical pinion 4 meshing with upper and lower conical gears 5 and 6. Gears 5 and 6 have external teeth 7 and conically hollow interiors 8 into which the exteriorly conical end portions 9 and 10 of a clutch member 11 extend.

Clutch member 11 is engaged as a nut on a spirally threaded section 12 of vertical intermediate output shaft 13. The gears 5 and 6 are carried in the housing 2 on bearings 14 and 15, respectively, disposed outwardly of the gears, while shaft 13 is mounted on pin bearings 16 and 17 in the bores of the gears, such as bore 18. A groove 19 engirdles clutch nut member 11 for receiving an actuating shoe. The lower end portion 20 of intermediate output shaft 13 is a splined coupled section.

Shaft 13 is longitudinally bored and provided with branch bores to pass oil longitudinally therethrough and to bearings 16 and 17 as shown at 21.

Housing 2 comprises a main body element 22, which has a lower circular opening 23 providing access to portion 20 of shaft 13, a circular side opening 24 at one side through which input shaft 3 enters the housing, a large circular side opening 25 opposite thereto adapted to accomodate an output shaft thrust bearing collar, and a circular top opening 26, in which a closure element 27 for retaining upper bearing 14 is disposed. A closure cap 28 is provided in central opening 29 of closure element 27.

An input shaft thrust bearing collar assembly 30 is disposed in and closes opening 24. Thrust bearings 31 and 32 within the collar are lubricated by communication, through bores 33 in shaft 3, with the open interior space of housing 2 and in which gears 5 and 6 and (spindle) spool 11 are disposed, and an oil passage 34 is provided communicating from such interior space of the housing through a portion 35 of the housing body element 22 and through closure element 27 into the interior of cap 28, such interior, in turn, being in communication with bore 21 in shaft 13. An oil seal 36 is provided in collar assembly 30 for input shaft 3.

Figure 2:
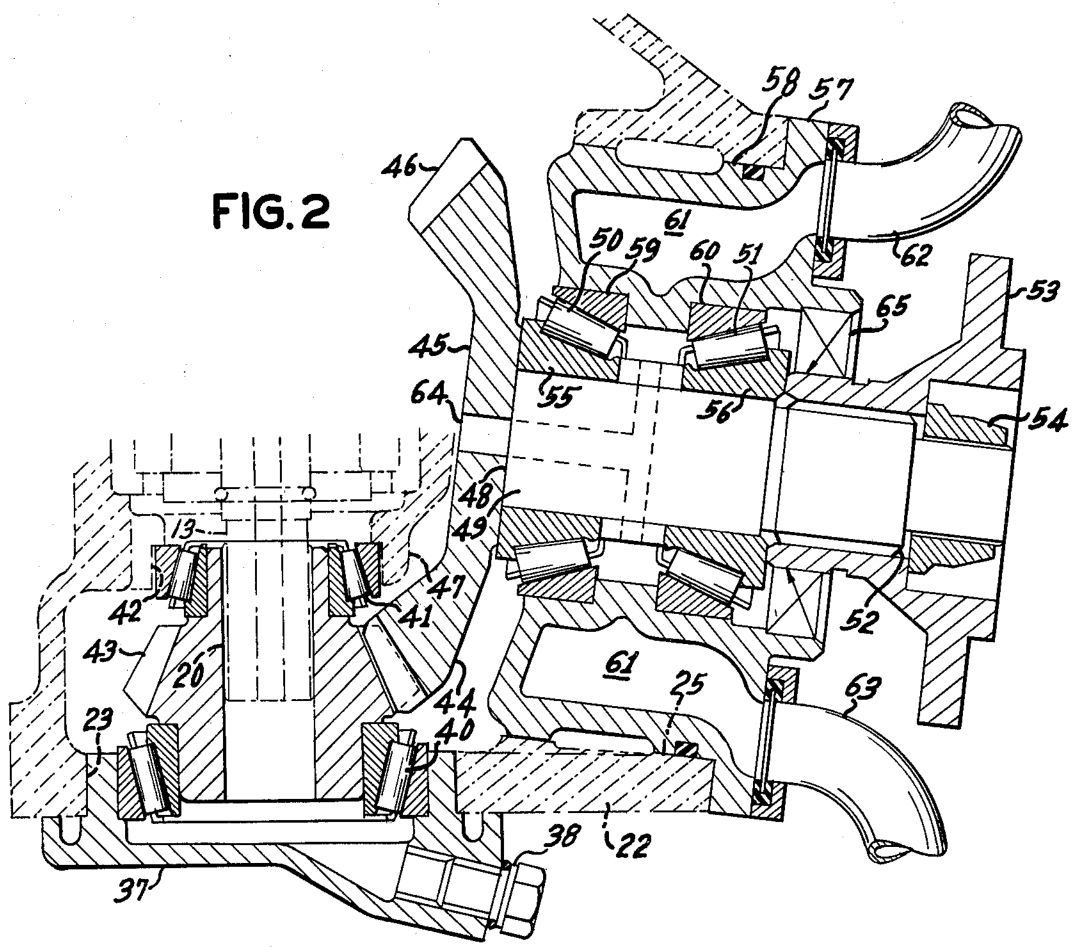
FIG. 2 is a partial cross sectional view in elevation of the reversing clutch drive assembly of FIG. 1 to which is attached a straight reducing gear transmission subassembly.
Figure 3:
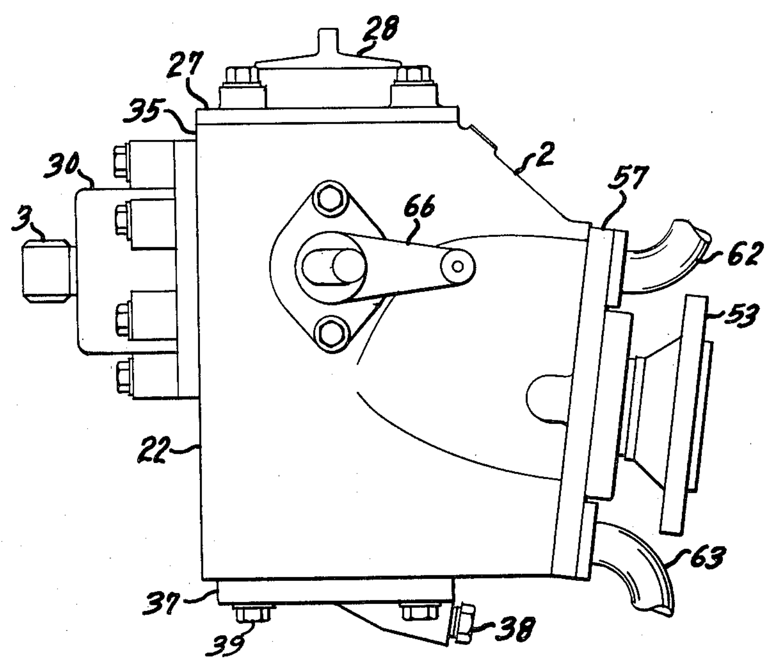
FIG. 3 is a side elevation view of the assembly of FIG. 2.

A reverse and reduction gear transmission embodying a subassembly as described above is shown in FIGS. 2 and 3, a portion of the subassembly being indicated by broken lines in FIG. 2, including the splined end portion 20 of the intermediate output shaft and portions of the housing body element 22. A bottom plug 37 including an oil drain fitting 38, closes bottom opening 23 of housing body 22, being held in place by bolts 39 as seen in FIG. 3. The plug 37 serves as a retainer for a lower thrust bearing 40, which, with an upper thrust bearing 41 retained in cavity or recess 42 interiorly of body 22, mount bevel pinion 43.

The pinion is drivingly engaged on portion 20 of shaft 13 and, in turn, is in driving mesh with bevel gear 44 disposed to one side of lower gear 6, the gear 44 being provided with a depressed central portion 45 inwardly of the ring of teeth 46, and the depressed portion being disposed toward and providing clearance for the lower gear 6 and for a portion 47 of the housing which mounts bearing 15.

The gear 44 is mounted on an end 48 of output shaft 49, and the shaft extends from that end through a pair of supporting thrust bearings 50 and 51 to an external coupling end portion 52 on which is disposed a coupling flange member 53 for coupling to the propeller shaft. A nut 54 threaded on end portion 52 retains the flange member on the shaft and maintains the inner bearing race elements 55,56 fixed between the gear 44 and the member 53.

The bearings 50,51 are included in a thrust collar assembly which further comprises a generally toroidal housing element 57 with a cylindrical outer surface portion 58 which is disposed within side opening 25 of the main housing body element 22 and secured thereto. The outer race elements 59,60 of thrust bearings 50, 51 are retained in the central opening of housing 57. Housing 57 includes a water chamber 61 outwardly around bearings 50,51 provided with means for providing a flow of cooling water therethrough including inlet and outlet conduits 62 and 63. Oil in the interior of housing 2 has access through bores 64 entering shaft 49 through gear 44 and end 48 and communicating in the central opening of element 57 with the space between bearings 50,51. An oil seal ring 65 around flange member 53 seals the outer end of the central opening beyond bearing 51 against loss of oil. An inner wall of water chamber 61 separates it from the interior of housing body 22 and permits heat exchange with the body of oil therein, and further heat exchange between the cooling water and the oil in and around bearings 50,51. Since much of the heat generated in the transmission may be expected to occur in the output shaft thrust bearings, it is particularly desirable that cooling water heat exchange with the oil be concentrated adjacent these bearings.

The reversing operation of the clutch embodying the clutch spindle member 11, shaft 13, gears 5 and 6 and gear 4 may be as described in the aforementioned U.S. Pat. No. 3,269,497 and operating lever 66 is, accordingly, mounted exteriorly on housing element 22 as seen in FIG. 3 for controlling a shoe (not shown) arranged in groove 19.

Figure 4:
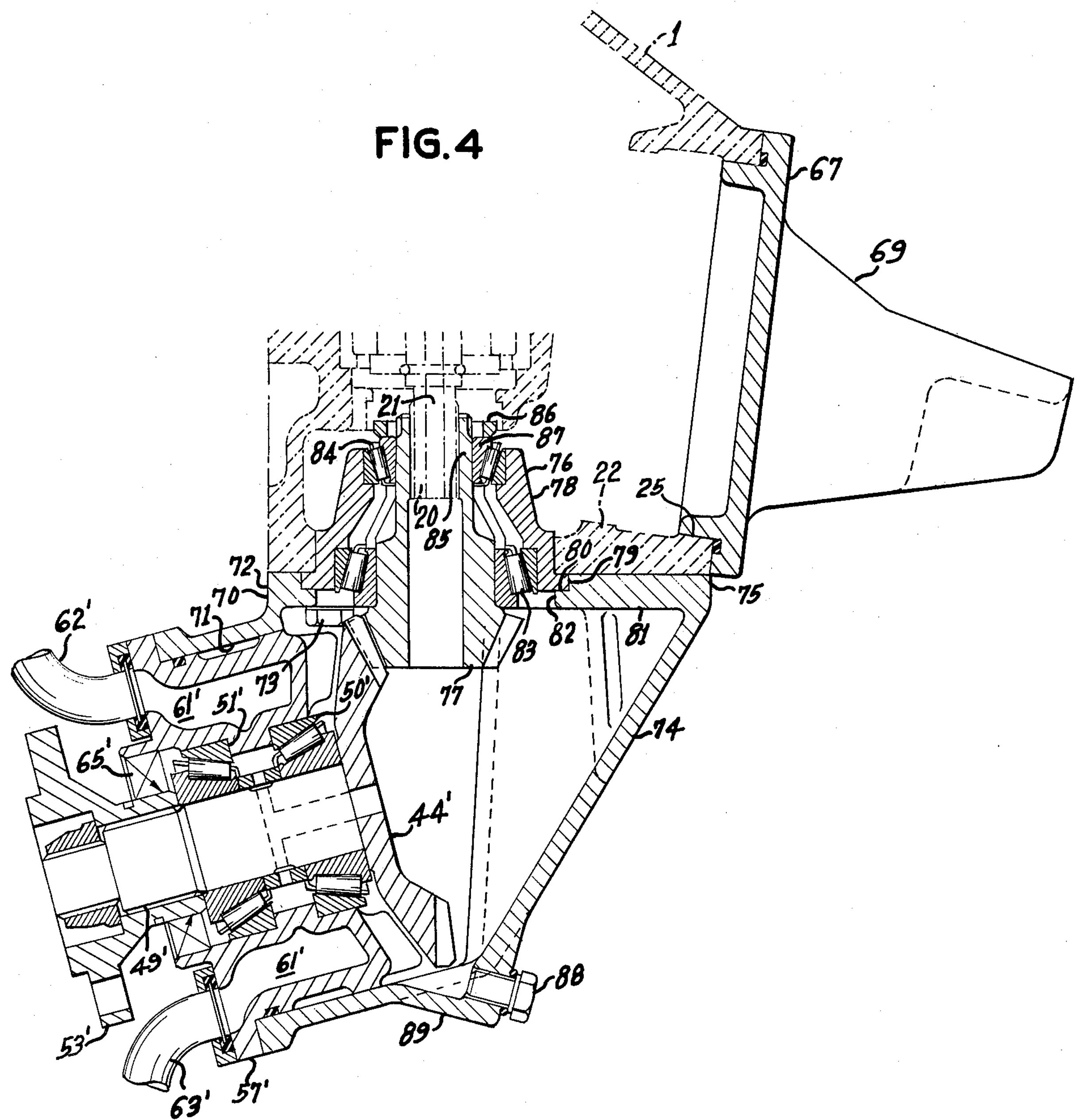
FIG. 4 is a partial cross sectional view in elevation of the reversing clutch drive assembly of FIG. 1 to which is attached a V-drive transmission subassembly.

A V-drive transmission subassembly 89 embodying reversing clutch subassembly 1 as shown in FIG. 1 is seen in FIG. 4, wherein subassembly 1 is represented by portions thereof shown in broken lines.

Figure 5:
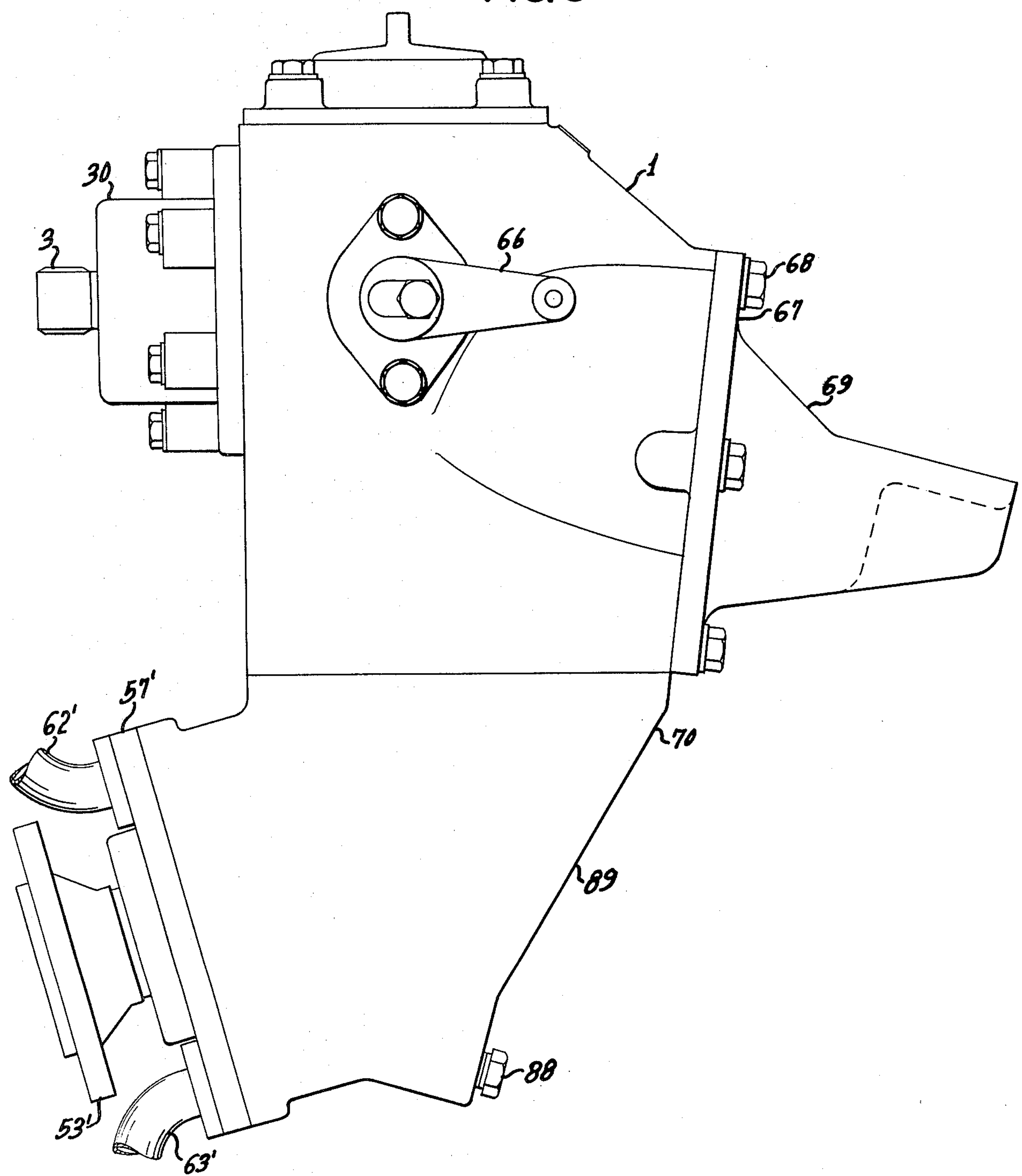
FIG. 5 is a side elevation view of the assembly of FIG. 4.

A cover plate 67 is bolted, by bolts 68 shown in FIG. 5, to main body housing element 22 of the reversing clutch subassembly in covering relation to side opening 25, and this cover plate includes an integral, outwardly extending arm or bracket 69 adapted to engage under a member fixed to the vessel frame for absorbing torque produced by propeller thrust, typically with a rubber dampening element interposed, such member and element being not shown.

The auxiliary V-drive housing 70 is attached to housing element 22 and includes a rearwardly directed opening 71 in which a thrust collar housing element 57' is disposed, being in all respects identical to element 57 previously described, including the several parts appurtenant thereto, such as bearings 50',51', output shaft 49', gear 44', water conduits 62', 63' oil seal 65', and water chamber 61'. The axis of the rearwardly directed opening 71 is downwardly inclined at an angle to the horizontal of approximately 14 degrees, an appropriate angle for the propeller shaft which is to be coupled to flange 53' in a V-drive vessel.

The propeller reaction force along output shaft 49' in the direction forwardly of the vessel imposes substantial force between the housings 22 and 70 tending to force the upper rearward edge 72 of the auxiliary housing 70 downwardly away from housing body 22. In order to reduce the tensional force on bolts 73 which are disposed adjacent edge 72 and which attach housing 70 to housing body 22, housing 70 includes a forward wall 74 which is upwardly and forwardly inclined thereby to have a long area throughout which the housing portions are in contact, extending from upper forward edge 75 of housing 70 the the upper rearward edge 72 thereof. The extra length of this area tends to minimize the tensile force on bolts 73.

A thrust bearing assembly 76 is provided for mounting bevel pinion 77 which engages on shaft portion 20 to be driven thereby. Assembly 76 comprises an outer circular collar 78 having an outward flange portion 79 engaging upwardly against housing body element 22 and seated on a ledge 80 formed in the upper wall 81 of housing 70, the ledge ringing the opening 82 through such wall. As in the thrust collar arrangement of bearings 50' and 51', the bearings 83 and 84 are tapered roller bearings for carrying the radial load and for carrying thrust loads. The bearings are oppositely oriented so as each to carry thrust loads in a respective but opposite direction. The bearings are held in position in collar 78 and engaged on throat portion 85 of pinion 77 by a nut 86 screwed on the throat portion and engaged against the inner race element 87 of bearing 84.

Pinion 77 is in mesh with bevel gear 44' to drive shaft 49' and, through coupling 53', the propeller shaft.

Oil may pass between the housing 2 of the reversing clutch subassembly and the auxiliary housing 70 through the bore 21 of shaft 13 which opens through the hollow interior of pinion 77 into the interior of housing 70. Oil may also pass through bearings 83 and 84 and the hollow interior of collar 78. Lubrication of bearings 50' and 51' and cooling of the oil by water in chamber 61' are accomplished in the same manner as above described in connection with thrust collar element 57 and its associated parts in FIG. 2. An oil drain fitting 88 is provided at bottom of housing 70.

FIG. 5 shows in side elevation a subassembly 1 joined with an auxiliary V-drive subassembly 89 in housing 70 to form a complete V-drive reversing transmission including a reversing clutch operating lever 66 for shifting the clutch between forward, neutral and reverse drive connections.

Figure 6:
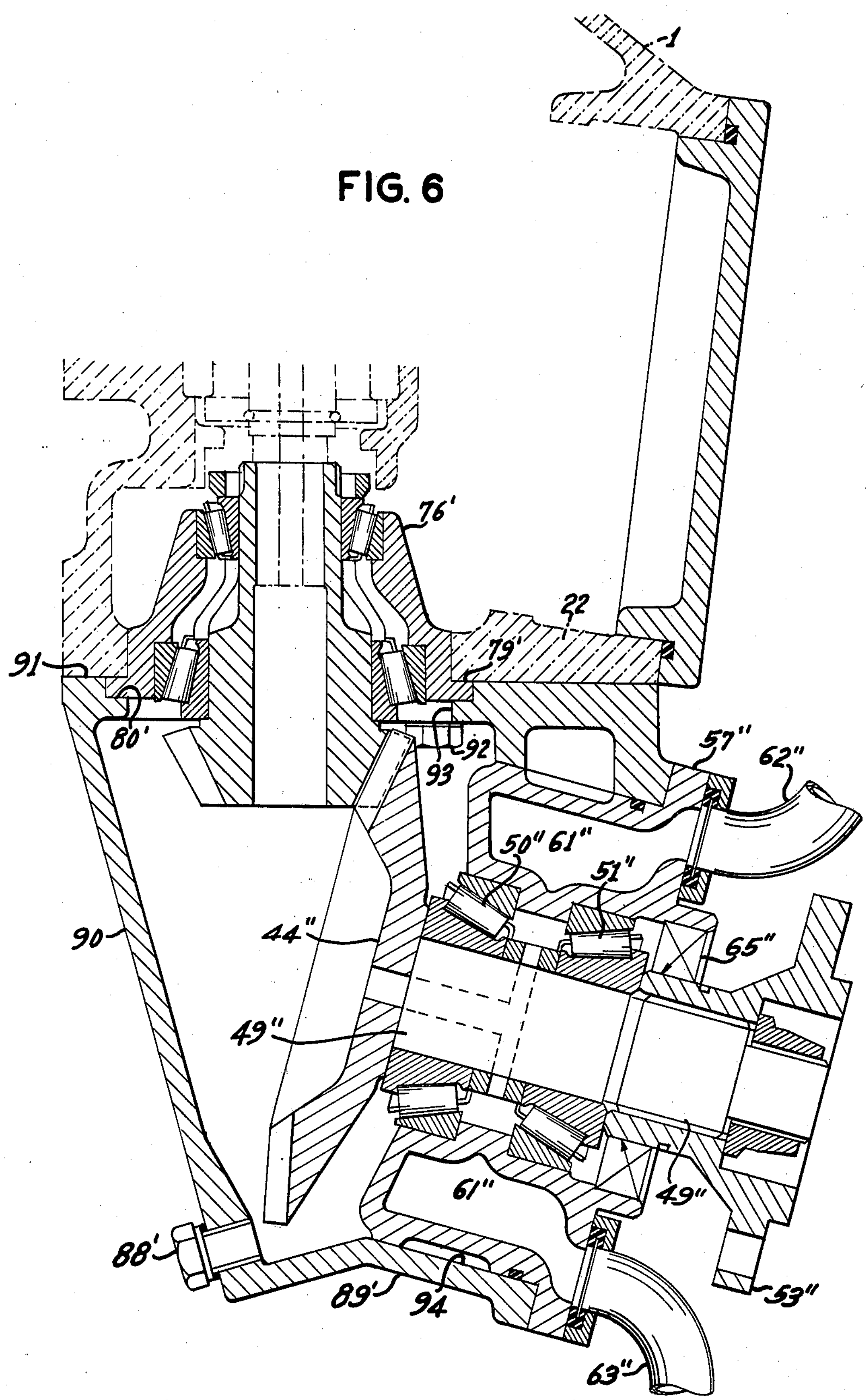
FIG. 6 is a partial cross sectional view in elevation of the reversing clutch drive assembly of FIG. 1 to which is attached a downstep reducing gear transmission subassembly.

An auxiliary downstep transmission subassembly 89' is shown in FIG. 6, together with portions of subassembly 1 shown in broken lines to representing the manner in which such two subassemblies are attached to form a complete downstep reversing transmission substantially identical in all respects to subassembly 89 of FIG. 4 except that the power transmission to the propeller shaft is directed opposite to that shown in FIG. 4.

Subassembly 89' comprises a housing 90 having an upper wall 91 to engage flat against the bottom of housing element 22, means, including bolt 92, being provided to attach the housings.

The upper wall 91 is provided with an opening 93 in which a thrust bearing assembly 76' is disposed. Such bearing assembly may, conveniently, be identical to bearing, assembly 76 previously described and it may be similarly held in place with peripheral flange 79' seated on ledge 80' in wall 91.

The housing 90 is provided with a downwardly and rearwardly directed opening 94 in which there is disposed thrust collar housing 57", bearings 50",51", output shaft 49", gear 44", water chamber 61", water conduits 62", 63" and oil seal 65" in the same relationship to each other as described with respect to FIG. 4. Coupling 53" is provided, as described in FIGS. 2 and 4, for joining the power transmission from shaft 49" to a propeller shaft (not shown).

Figure 7:
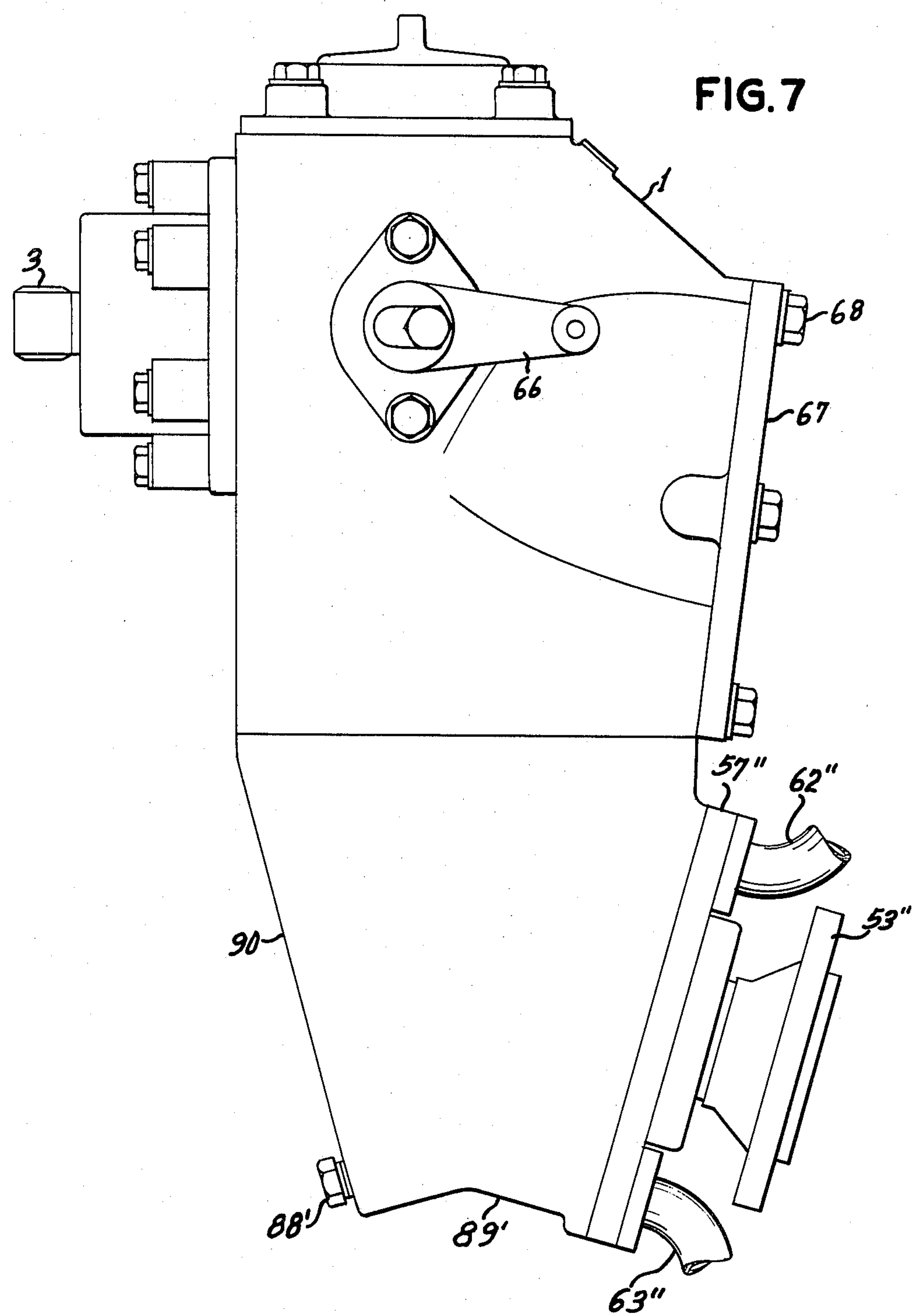
FIG. 7 is a side elevation view of the assembly of FIG. 6.

FIG. 7 shows in side elevation subassembly 1 joined with an auxiliary downstep transmission, subassembly 89' in housing 90 to form a complete, reversing downstep transmission including a reversing clutch operating lever 66 for shifting the clutch between forward, neutral, and reverse drive connections.

Figure 8:
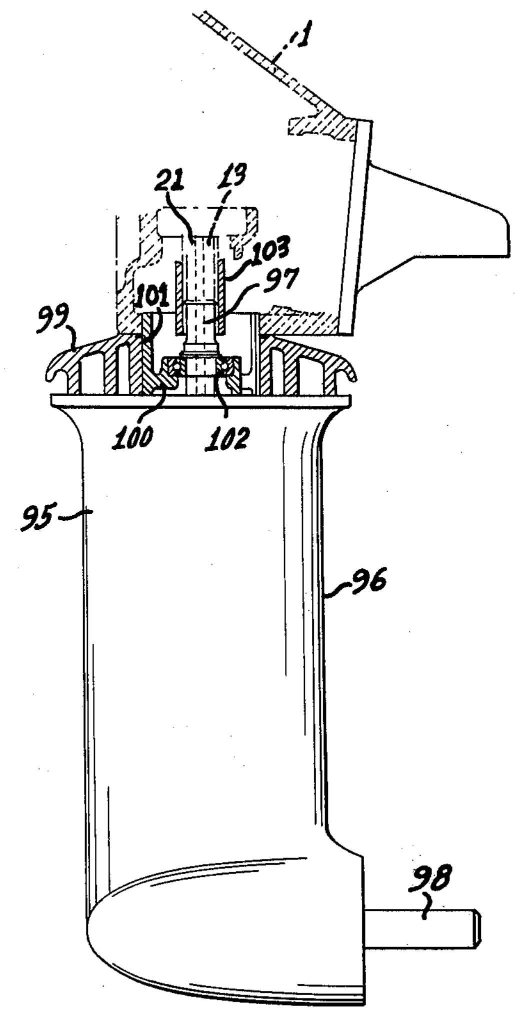
FIG. 8 is a partial cross sectional view in elevation of the reversing clutch drive assembly of FIG. 1 to which is attached a vertical leg drive subassembly for use projecting downwardly through the bottom of a boat.

FIG. 8 shows in partial cross section the application of subassembly 1, portions of which are shown in broken lines, joined with a fixed vertical drive leg subassembly 95 to form a complete reversing transmission for use in sailboats or other boats where the vertical drive extends through the boat bottom. Subassembly 95 comprises a housing 96 through which extends vertical shaft 97 with suitable means, e.g. bevel gears, to transmit the driving power to propeller shaft 98. At the top of housing 96 is support ring 99 on which rests subassembly 1. Bearing collar 100 is disposed in opening 101 of ring 99 and contains bearing 102 supporting vertical shaft 97. Shaft 97 is directly coupled to shaft 13 by means of sleeve coupler 103. Lubrication of the components in subassembly 95 by continuation of oil bore 21 in shaft 13 by a suitable oil bore in shaft 97 and cross bores where necessary or desirable.

Figure 9:
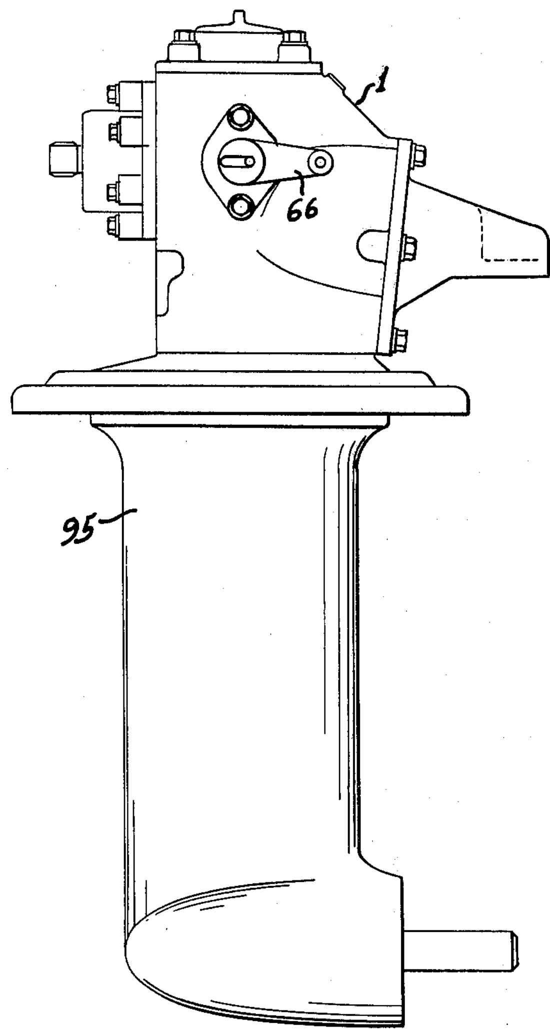
FIG. 9 is a side elevation view of the assembly of FIG. 8.

FIG. 9 shows in side elevation subassembly 1 joined with subassembly 95 to form a complete reversing transmission including a reversing clutch operating lever 66 for shifting the clutch between forward, neutral, and reverse drive connections.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A reversing clutch drive assembly adapted for attachment thereto of alternative selected gear transmission subassemblies comprising a horizontal input shaft extending from an external input connection end to an opposite end, a first bevel gear wheel on said opposite end, a housing member having a horizontally extending hollow sleeve portion through which said shaft extends, an oil seal between said shaft and sleeve, a first bearing in said sleeve mounting said shaft and disposed between said seal and said gear wheel, a vertical intermediate shaft disposed in alignment with said horizontal shaft, two bevel gears mounted on said vertical intermediate shaft and rotatable with respect thereto, disposed respectively above and below and each in mesh with said first bevel gear wheel, clutch means for disengaging and selectively drivingly coupling the upper or the lower of said two bevel gears to said vertical intermediate shaft, a housing body portion connected to said housing member, second and third bearings within said body portion mounted on said vertical intermediate shaft, respectively above said upper bevel gear and below said lower bevel gear, said body portion being provided with a side opening opposite said housing member and a bottom opening below said third bearing, said vertical intermediate shaft extending below said lower bevel gear in said bottom opening and adapted for operative connection to gear transmission means for transmitting power selectively through said bottom opening or through said side opening.

2. The assembly of claim 1 wherein said input shaft and said intermediate shaft contain axial bores intersecting with radial crossbores communicating with channels and spaces inside said housing member and said housing body portion to provide a reservoir and conduits for supplying lubricating oil to all moving parts of said assembly.

3. The assembly of claim 1 wherein said intermediate shaft contains a spirally threaded portion between said upper and lower gears.

4. The assembly of claim 3 wherein said clutch means comprises a double cone clutch member slideably mounted on and in mesh with said spirally threaded portion of the intermediate shaft, selectively moveable upwardly or downwardly to mate with a corresponding female conical cavity in the respective upper or lower bevel gear.

5. A V-drive transmission for a boat comprising the reversing clutch drive assembly of claim 1 in an upper housing and an output power transmission assembly in a lower housing, said upper housing being adapted to transmit power from said reversing clutch drive assembly through said bottom opening, and said side opening being covered by a closure member said output power transmission assembly comprising an inverted bevel gear affixed to the lower end of said intermediate shaft and supportedly attached to said upper housing with thrust bearing means, a bevel gear mounted on an output shaft in said lever housing in mesh with said inverted bevel gear, said output shaft being downwardly inclined and extending rearwardly through a rearward opening in said lower housing, thrust bearing means for said output shaft supportedly attached to said lower housing and disposed in said rearward opening thereof, said means comprising a thrust bearing, a thrust bearing collar surrounded by a water jacket with nlet and outlet conduits attached thereto, and an oil seal around said output shaft at said rearward opening.

6. The transmission of claim 5 wherein said input shaft, said intermediate shaft and said output shaft contain axial bores intersecting with radial crossbores communicating with channels and spaces inside said upper and lower housings to provide a reservoir and conduits for supplying lubricating oil to all moving parts of said assembly interiorly of said housings.

7. The transmission of claim 5 wherein said intermediate shaft contains a spirally threaded portion between said upper and lower bevel clutch gears.

8. The transmission of claim 7 wherein said clutch means comprises a double cone clutch member slideably mounted on and in mesh with said spirally threaded portion of the intermediate shaft selectively moveable upwardly or downwardly to mate with a corresponding female conical cavity in the respective upper or lower bevel gear.

9. A downstep reducing gear transmission for a boat comprising the reversing clutch drive assembly of claim 1 in an upper housing and an output power transmission assembly in a lower housing, said upper housing being adapted to transmit power from said reversing clutch drive assembly through said bottom opening, and said side opening being covered by a closure member, said output power transmission assembly comprising an inverted bevel gear affixed to the lower end of said intermediate shaft and supportedly attached to said upper housing with thrust bearing means, a bevel gear mounted on an output shaft in said lower housing in mesh with said inverted bevel gear, said output shaft being downwardly inclined and extending rearwardly through a rearward opening in said lower housing, thrust bearing means for said output shaft supportedly attached to said lower housing and disposed in said rearward opening thereof, said thrust bearing means comprising a thrust bearing, a thrust bearing collar surrounded by a water jacket with inlet and outlet conduits attached thereto, and oil seal around said shaft at said rearward opening.

10. The transmission of claim 9 wherein said input shaft, said intermediate shaft and said output shaft contain axial bores intersecting with radial crossbores communicating with channels and spaces inside said upper and lower housings to provide a reservoir and conduits for supplying lubricating oil to al moving parts of said transmission.

11. The transmission of claim 9 wherein said intermediate shaft contains a spirally threaded portion between said upper and lower bevel clutch gears.

12. The transmission of claim 11 wherein said clutch means comprises a double cone clutch member slideably mounted on and in mesh with said spirally threaded portion of the intermediate shaft, selectively moveable upwardly or downwardly to mate with a corresponding female conical cavity in the respective upper or lower bevel gear.

13. A gear transmission to extend vertically downward through the bottom of a boat comprising the reversing clutch drive assembly of claim 1 in an upper housing and an output power transmission assembly in a lower housing, said upper housing being adapted to transmit power from said reversing clutch drive assembly through said bottom opening, and said side opening being covered by a closure member, said output power transmission assembly comprising a second vertical intermediate shaft in said lower housing coaxial with said vertical intermediate shaft in said upper housing, coupling means for joining said intermediate shafts, a horizontal output shaft extending rearwardly through an opening in said lower housing, gear means for transmitting rotary power from the lower end of said second intermediate shaft to said output shaft, thrust bearing means for said output shaft, and sealing means around said output shaft.

14. The transmission of claim 13 wherein said input shaft, said intermediate shafts and said output shaft contain axial bores intersecting with radial crossbores communicating with channels and spaces inside said upper and lower housings to provide a reservoir and conduits for supplying lubricating oil to all moving parts of said transmission.

15. The transmission of claim 13 wherein said vertical intermediate shaft in said upper housing contains a spirally threaded portion between said upper and lower bevel clutch gears.

16. The transmission of claim 15 wherein said clutch means comprises a double cone clutch member slideably mounted on and in mesh with said spirally threaded portion of the vertical intermediate shaft, selectively moveable upwardly or downwardly to mate with a corresponding female conical cavity in the respective upper or lower bevel gear.

17. A straight reducing gear transmission for a boat comprising a housing, a horizontal input shaft rotatably carried by and projecting forwardly from said housing, a first bevel gear fixed to said input shaft and disposed within said housing, a vertical intermediate shaft in said housing, upper and lower bevel clutch gears rotatably mounted on said intermediate shaft disposed respectively above and below said first bevel gear and in mesh therewith for rotation in respectively opposite directions, a respective bearing in said housing for each of said clutch gears, bearings for said intermediate shaft in each of said clutch gears, clutch means for disengaging and selectively drivingly coupling said upper or lower bevel clutch gears to said intermediate shaft, said housing having a downwardly disposed bottom opening being covered by a closure member; said intermediate shaft being accessible through said bottom opening, an inverted bevel gear affixed to the lower end of said intermediate shaft and supportedly attached to said housing with thrust bearing means, a bevel gear mounted on an output shaft in said housing in mesh with said inverted bevel gear, said output shaft being downwardly inclined and extending rearwardly through a rearward opening in said housing, opposite to said input shaft, thrust bearing means for said output shaft supportedly attached to said housing and disposed in said rearward opening thereof, said thrust bearing means comprising a thrust bearing collar surrounded by a water jacket with inlet and outlet conduits attached thereto, and an oil seal around said shaft at said rearward opening.

18. The transmission of claim 17 wherein said input shaft, said intermediate shaft and said output shaft contain axial bores intersecting with radial crossbores communicating with channels and spaces inside said housing to provide a reservoir and conduits for supplying lubricating oil to all moving parts of said transmission.

19. The transmission of claim 17 wherein said intermediate shaft contains a spirally threaded portion between said upper and lower bevel clutch gears.

20. The transmission of claim 19 wherein said clutch means comprises a double cone clutch member slideably mounted on and in mesh with said spirally threaded portion of the intermediate shaft, selectively moveable upwardly or downwardly to mate with a corresponding female conical cavity in the respective upper or lower bevel gear.

* * * * *